United States Patent
Zamir

(10) Patent No.: US 9,546,799 B2
(45) Date of Patent: Jan. 17, 2017

(54) SOLAR ENERGY COLLECTION SYSTEM

(75) Inventor: Ofri Zamir, Hogla (IL)

(73) Assignee: DZSOLAR LTD, Richmond (GB)

( * ) Notice: Subject to any disclaimer, the term of this patent is extended or adjusted under 35 U.S.C. 154(b) by 613 days.

(21) Appl. No.: 14/003,107

(22) PCT Filed: Mar. 7, 2012

(86) PCT No.: PCT/IL2012/050075
§ 371 (c)(1),
(2), (4) Date: Sep. 4, 2013

(87) PCT Pub. No.: WO2012/120512
PCT Pub. Date: Sep. 13, 2012

(65) Prior Publication Data
US 2013/0333694 A1     Dec. 19, 2013

Related U.S. Application Data

(60) Provisional application No. 61/451,157, filed on Mar. 10, 2011.

(51) Int. Cl.
*F24J 1/00* (2006.01)
*F24J 2/26* (2006.01)
(Continued)

(52) U.S. Cl.
CPC ........... *F24J 2/265* (2013.01); *F24J 2/248* (2013.01); *F24J 2/40* (2013.01); *F24J 2/402* (2013.01); *Y02E 10/44* (2013.01)

(58) Field of Classification Search
CPC ........................................ F24J 2/402
(Continued)

(56) References Cited

U.S. PATENT DOCUMENTS

| | | | |
|---|---|---|---|
| 3,970,069 A | | 7/1976 | Pickett |
| 4,048,981 A | * | 9/1977 | Hobbs, II ............ F24J 2/204 |
| | | | 126/584 |

(Continued)

FOREIGN PATENT DOCUMENTS

| | | |
|---|---|---|
| AU | 2009201076 | 11/2009 |
| CN | 201363929 | 12/2009 |

(Continued)

OTHER PUBLICATIONS

International Search Report and Written Opinion from International Application No. PCT/IL2012/050075 mailed Aug. 8, 2012.

*Primary Examiner* — Avinash Savani
(74) *Attorney, Agent, or Firm* — Dorsey & Whitney LLP

(57) ABSTRACT

A solar energy collection system comprises hollow radiation absorber(s) in an enclosure, each absorber for filling with working fluid, to absorb radiation impinging thereon and transform its energy into heat to thereby heat the fluid. The system comprises an inlet non-return valve upstream of each absorber, for allowing a flow of the fluid thereto; and an outlet valve downstream of each absorber for allowing a flow of the fluid out. The system comprises a measuring device for determining parameter(s) of the fluid within each absorber, which depends on the heat absorbed thereby; and a controller that controls operation of at least the outflow valve between its open state in which the fluid can flow freely out of the associated absorber, and its closed state in which the fluid filling the associated absorber is held therein for a period of time depending on a desired change of the parameter.

33 Claims, 4 Drawing Sheets

(51) Int. Cl.
*F24J 2/40* (2006.01)
*F24J 2/24* (2006.01)

(58) Field of Classification Search
USPC ................................................ 126/714, 600
See application file for complete search history.

(56) References Cited

U.S. PATENT DOCUMENTS

| | | | | |
|---|---|---|---|---|
| 4,119,087 | A | * | 10/1978 | Cook .................. F24D 19/1057 |
| | | | | 126/588 |
| 4,126,122 | A | | 11/1978 | Bross |
| 4,133,338 | A | | 1/1979 | Honikman |
| 4,153,955 | A | | 5/1979 | Hinterberger |
| 4,207,866 | A | | 6/1980 | Boyd |
| 4,232,655 | A | | 11/1980 | Frissora et al. |
| 4,326,502 | A | | 4/1982 | Radenkovic |
| 4,474,169 | A | | 10/1984 | Steutermann |
| 4,519,380 | A | * | 5/1985 | Laing ........................ F24J 2/402 |
| | | | | 126/583 |
| 7,708,010 | B2 | * | 5/2010 | Sweet ................... F24D 11/003 |
| | | | | 126/609 |
| 2005/0087186 | A1 | * | 4/2005 | Stahl ........................ F24J 2/345 |
| | | | | 126/640 |

FOREIGN PATENT DOCUMENTS

| | | |
|---|---|---|
| DE | 29912457 U1 | 12/1999 |
| DE | 102006023627 | 11/2007 |
| FR | 2376377 | 7/1978 |
| WO | WO2011048594 | 4/2011 |

* cited by examiner

- - - - Information communication
— - — Electric communication
——— Fluid communication

- - - - - Information communication
— - — Electric communication
———— Fluid communication

SOLAR ENERGY COLLECTION SYSTEM

FIELD OF THE PRESENTLY DISCLOSED SUBJECT MATTER

This presently disclosed subject matter relates to solar energy collection systems, in particular to solar energy collection systems configured to heat and/or pressurize a working fluid therewithin.

BACKGROUND

This present disclosure concerns the field of thermal solar collectors. In particular, it pertains to closed-circle fluid collectors incorporating several sub-assemblies for absorbing heat within one enclosure, and such closed-circle fluid collectors exhibiting possibilities of flow control.

Such collectors have been described, for example, in DE 29912457 U1 and U.S. Pat. No. 4,153,955.

SUMMARY

According to one aspect of the presently disclosed subject matter, there is provided a thermal solar energy collection system having a system inlet and a system outlet comprising:

one or more hollow radiation absorbers, each having an inlet end configured for being in inlet fluid communication with the system inlet, and an outlet end, each absorber configured for being filled by the fluid, to absorb solar radiation impinging thereon and transform its energy into heat and to thereby allow the fluid to be heated;

an enclosure enclosing the one or more radiation absorbers, for blocking the generated heat from dissipating into surrounding environment;

an inlet non-return valve upstream of each absorber, for allowing a flow of the fluid thereto through the absorbers inlet end, while preventing backflow therefrom;

an outlet valve downstream of each absorber for allowing a flow of the fluid out thereof via its outlet end;

a measuring device for determining at least one parameter of the fluid within each radiation absorber, which depends on the amount of heat absorbed thereby; and a controller configured to control the operation of at least the outflow valve at least between its open state in which the fluid can flow freely through the associated heat absorber, and its closed state in which the fluid filling the associated heat absorber is held therein for a period of time depending at least on a desired change of the measured parameter.

Such a solar energy collection system thus can allow for the locking of fluid within a defined volume, for a defined time, the volume being exposed to solar radiation and being insulated from its surroundings. The effect is one of allowing raising temperature and pressure of the enclosed fluid beyond the limits available in known systems, where fluid absorbs solar energy while flowing through radiation absorbers exposed to the sun.

The solar energy system can further comprise any of the aspects described below in this or other part of present application, in any order and combination thereof.

The absorbers within the enclosure can each be thermally insulated from all other absorbers within the enclosure.

The outlet valves can be situated inside or outside of the enclosure. The former can be advantageous, for example, when it is desired, for whatever reason, to isolate them from the surrounding environment, and the latter can be advantageous, for example, when it is desired to keep the outlet valves at temperatures lower than those that are expected within the enclosure.

The same is correct with respect to the inlet valves, which can be in the form of ordinary non-return check valves configured to be always open at least during the operation of the system, or they can be in the form of control valves configured to be selectively operated between an open state at the time when the corresponding outlet valve is in its closed state, and a closed state at the time when the corresponding outlet valve is in its open state.

The inlet and the outlet valves can be operated by electric energy or energy other than electric energy. In any case, it can also be advantageous to place the valves in the shadow of the absorbers, in the immediate vicinity of the enclosure's backside.

The solar energy collection system can comprise an outtake manifold in fluid communication with the outlet valves, allowing outlet fluid communication thereof with the outlet end of each of the absorbers via its corresponding outlet valve. The manifold's own outlet will thus constitute that of the entire enclosure.

The solar energy collection system can further comprise an intake manifold in fluid communication with the absorbers inlet valves, for providing the inlet fluid communication for each of the absorbers via its corresponding inlet valve.

The outtake and/or the intake manifold can be situated outside or inside of the enclosure, for reasons similar to those indicated above with respect to the outlet valves of the absorbers. In addition, in cases where the inlet valves are operable by energy other than electricity, it is advantageous that the inlet valves and the intake manifold be disposed within the enclosure, and in cases where the outlet valves are electrically operable, it is advantageous that these valves and the outtake manifold be disposed outside the enclosure, and that optionally they be configured for being mounted in the shadow of the enclosure, regardless of their being mounted inside or outside the enclosure. The controller can be configured to keep the outlet valve of at least one of the absorbers open whilst keeping the outlet valve of at least one other of the absorbers closed. When the system comprises at least three absorbers enclosed within one enclosure, the controller can be configured for keeping open the outlet valves of the absorbers in turn, so that, when the outlet valve of each one of the three absorbers is open, the outlet valves of the other two absorbers are closed.

The absorbers can each be interconnected serially via their valves with at least one other radiation absorber. This offers the option to raise temperature in several stages, reaching significantly higher temperatures that were possible with just one valve The solar thermal energy collection system can further comprise a bypass mechanism with a bypass valve in fluid communication with the system inlet and a bypass heater with a heater inlet in fluid communication with said bypass valve and a heater outlet in fluid communication with the system outlet, forming therewith a hybrid system. Thus, when the solar thermal energy collection system can deliver fluid of desired parameters, the fluid is directed into that system. At times where the system cannot deliver fluid of desired parameters, the bypass system is activated and managed such that it delivers fluid of desired parameters.

The solar thermal energy collection system alone or the above hybrid system can be connected to a closed-cycle heat exchange system, like a water heating system or an air conditioning system or an industrial thermal storage system, or any other heat consuming system.

According to another aspect of the presently disclosed subject matter there is provided a process of energy collection comprising:

providing a solar energy collection system as described hereinabove;

determining at least one parameter of fluid in at least one radiation absorber of the system, which depends on the amount of heat absorbed thereby; and controlling the operation of an outflow control valve of the absorber at least between its open state in which said fluid can flow freely out of the absorber, and its closed state in which the fluid filling the heat absorber is held therein for a period of time depending at least on a desired change of the parameter.

The process can further comprise any steps associated with the aspects listed above or any aspects described below in this or other part of present application, in any order and combination thereof.

The process can include guiding fluid into the absorber by a designed pressure differential between the intake manifold and the interior of the absorber. On the other hand, the process can comprise controlling the flow of fluid by selectively operating an inlet valve to open and allow fluid to flow into the respective absorber, while blocking the fluid from exiting the absorber through the outlet valve by keeping it closed, and then closing the inlet valve, locking the fluid inside the absorber and allowing it to be heated by solar radiation until a desired change in the fluid parameter is achieved. Once the desired change has been achieved, the process can comprise letting the now pressurized and heated fluid exit he absorber by way of opening the outlet valve, while the inlet valve stays closed.

The process can further include changing inlet flow parameters during operation of the process.

The process can further comprise repeating the above steps for several different absorbers in turn, always letting fluid flow into one, and out of another, absorber.

The process can further include allowing an inlet flow of fluid into at least three different absorbers situated in the same enclosure, by way of a one-way check valve disposed upstream of each such absorber, and controlling the outflow from the absorbers in turn such that always one absorber discharges hot, pressurized fluid while the fluid in the other two absorbers is at different stages of absorbing solar energy and thereby is under different temperature and pressure values.

The process can comprise heating the fluid at several stages in series. In this case, each stage of the process excluding the last stage, can comprise:

injecting the fluid into one absorber, at certain relatively low value of at least one parameter thereof, locking the fluid inside the absorber at least by closing the absorber's outlet valve for a time necessary to reach a pre-defined change of said at least one parameter;

once the above change is achieved, ejecting the fluid from the absorber by opening its outlet valve; and allowing the fluid to pass towards a next absorber where it will be heated to achieve a further change in said parameter relative to that achieved in the previous absorber.

BRIEF DESCRIPTION OF THE DRAWINGS

In order to understand the presently disclosed subject matter and to see how it can be carried out in practice, embodiments will now be described, by way of non-limiting examples only, with reference to the accompanying drawings, in which.

DETAILED DESCRIPTION OF EMBODIMENTS

Figure 1:
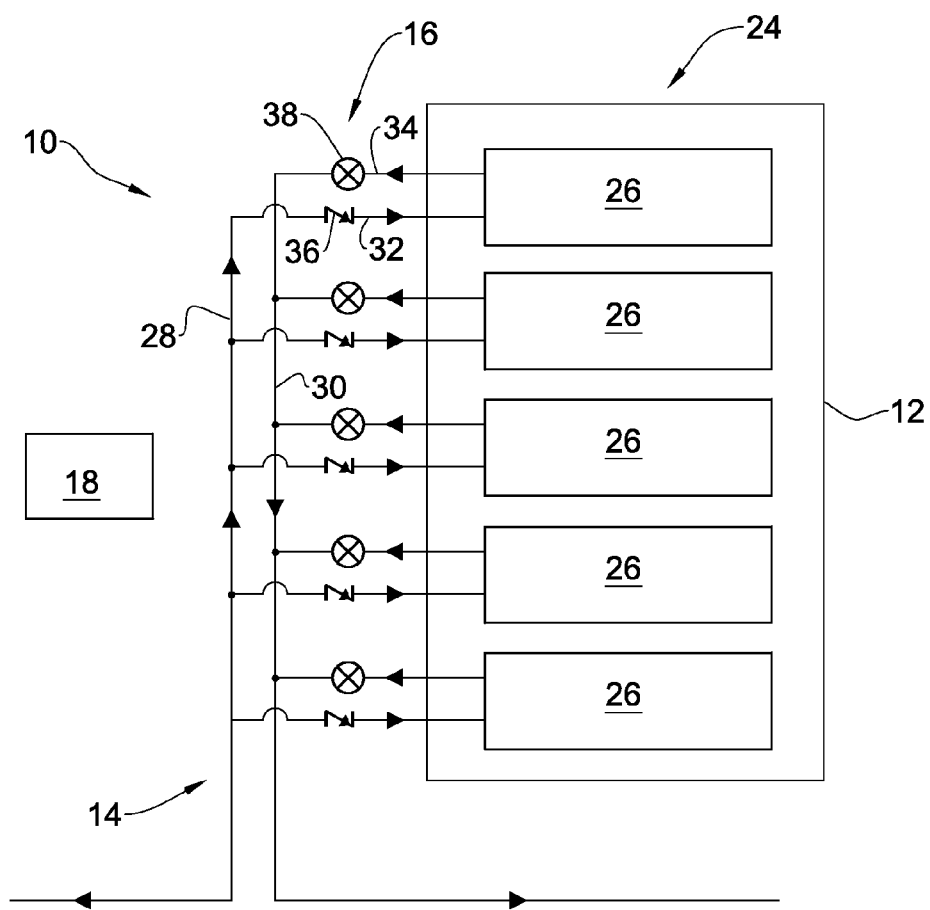
FIG. 1 is a schematic view of a solar energy collection system according to the presently disclosed subject matter.

As illustrated in FIG. 1, there is provided a solar energy collection system, which is generally designated at 10. The solar energy collection system 10 is designed and configured to utilize impinging solar radiation to heat and/or raise the pressure of a working fluid therein, and to selectively maintain at least a portion of the working fluid therein without flowing (i.e., at zero velocity) while permitting another portion of the working fluid to flow therethrough. The solar energy collection system 10 comprises one or more panels 12 each comprising one enclosure 20 (only one of which is illustrated in FIG. 1), tubing generally designated 14 via which the working fluid is configured to flow into and out of each panel, a plurality of heating and control devices 16 associated with each of the panels, an array of solar energy absorbers 24 and a controller 18

The solar energy collection system described herein can be used for any application wherein a prolonged exposure of working fluid to the sun is desirable. PCT/IL2010/000863, the entire content of which is incorporated herein by reference discloses a number of such applications. The working fluid can be, for example, refrigerant gas for use in an air-conditioning or heat pump system. Alternatively, it can be water for use in a domestic or commercial water-heating system. Moreover, it will be appreciated that the solar energy collection system disclosed herein can be used with any suitable working fluid, mutatis mutandis, and can consequently work with any external system, e.g. a heat exchange system, using such working fluid in a closed cycle with the solar energy collection system so that the working fluid ingresses such external system after being heated by the solar energy collection system, and egresses the external system after heat is withdrawn from the working fluid.

Figure 2:
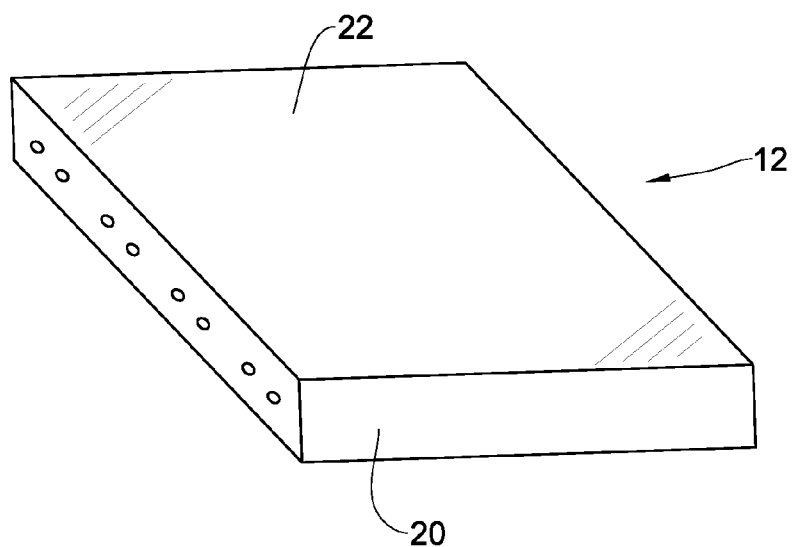
FIG. 2 is a schematic perspective view of an example of a solar panel of the solar energy collection system illustrated in FIG. 1.

The solar panel 12 is designed to be exposed to solar radiation and allow working fluid contained in part of the tubing to be heated/pressurized thereby. As illustrated in FIG. 2, it comprises an enclosure 20 containing portions of the tubing 14 therewithin. The enclosure 20 comprises a radiation-facing surface 22, which is designed for facing the sun when the solar energy collection system 10 is installed, and which is designed to allow the maximum amount of solar radiation, or the maximum amount of predetermined frequencies of solar radiation (for example infrared), to pass therethrough. Thus, it can be made of glass, PMMA, or any other suitable material. In addition, it can be provided with one or more coatings designed to increase the amount of solar energy that passes therethrough. The enclosure 20 can be evacuated, i.e., once the tubing 14 and any other solid components are installed therein, a vacuum can be produced in the remaining space, or filled with an inert gas, or any other transparent insulating substance. This reduces heat loss from the tubing 14 to the atmosphere surrounding the enclosure 20.

In addition, as seen in FIG. 1, the solar energy absorbers array 24 comprises an array of tubing clusters 26, which will be discussed below.

The tubing 14 comprises an intake manifold 28 and an outtake manifold 30. The intake manifold 28 distributes working fluid entering the solar panel 12 among the tubing clusters 26 via a plurality of their inlets 32, and the outtake manifold 30 collects the working fluid therefrom via a plurality of their outlets 34 and outputs it in a single stream towards an external system as mentioned above.

Each of the inlets 32 is provided with an inlet valve in the form of a check valve 36, constituting one of the control devices, which is configured to allow flow of the working fluid in a single direction toward the corresponding tubing cluster 26, and to block flow thereof in the opposite direction. Thus, any working fluid flowing through the intake manifold 28 enters the solar panel 12 via the inlets 32, and is prevented from exiting thereby.

Each of the outlets 34 is provided with an outlet control valve 38 which is operated by the controller 18. When an outlet control valve 38 is in an open position, working fluid can flow freely through its associated tubing cluster 26. When the outlet control valve 38 is in a closed position, the flow of working fluid through its associated tubing cluster 26 is stopped, thus allowing the working fluid therein to be exposed to solar radiation for an increased amount of time, allowing the temperature and/or pressure thereof to be raised more than it would be if working fluid would be allowed to flow freely therethrough.

It will be appreciated that while the intake and outtake manifolds 28, 30, inlets 32, outlets 34, and check and control valves 36, 38 are illustrated as being outside of the solar collector 12, some or all of them can be provided therewithin, for example behind the tubing clusters as seen from the direction of the impinging solar radiation. According to this arrangement, solar radiation is not impeded from reaching the tubing clusters 26, and the overall footprint of the solar energy collection system 10 can be reduced.

Figure 3:
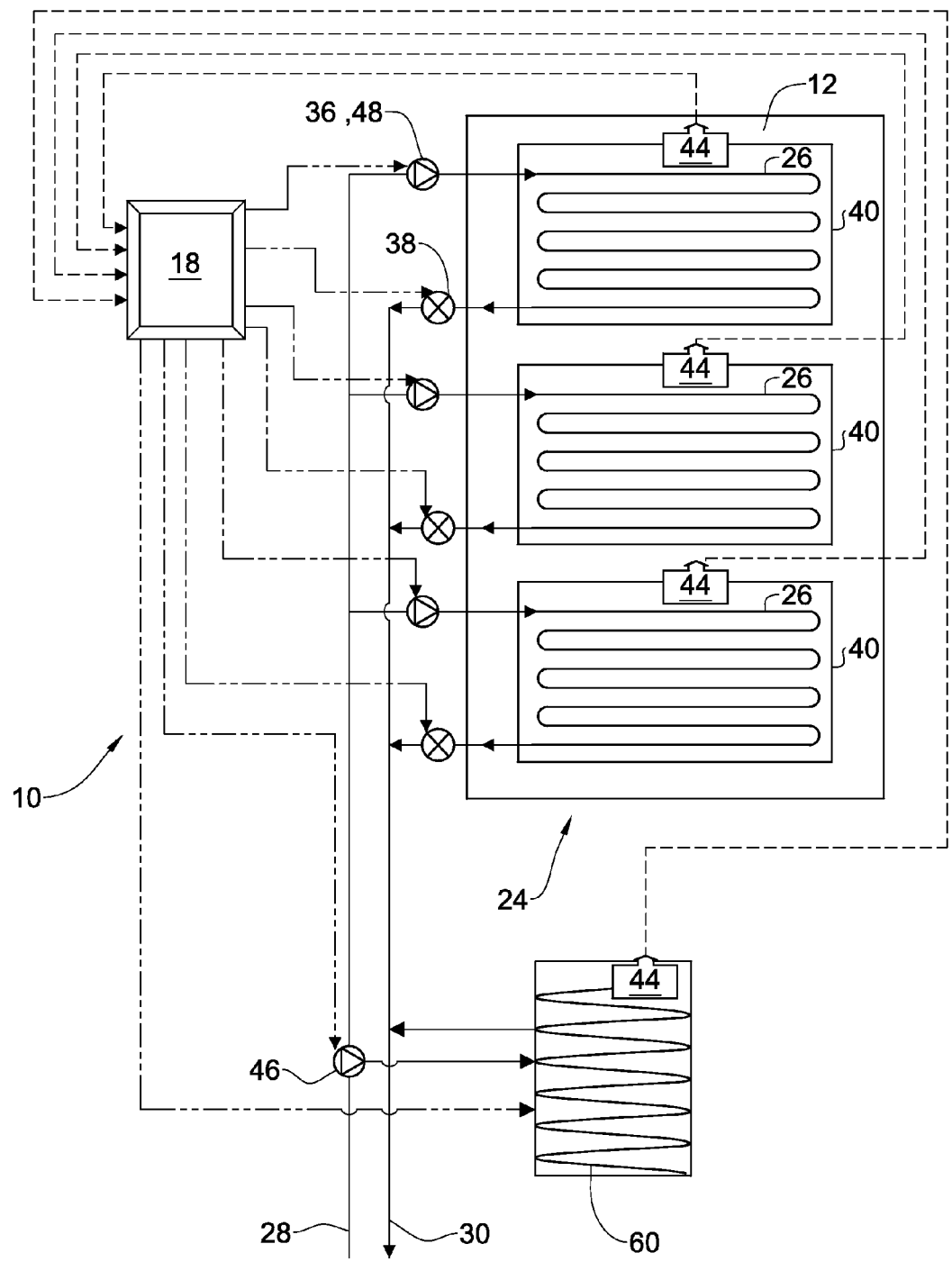
FIG. 3 is a schematic view of a specific example of the solar energy collection system illustrated in FIG. 1.

Each of the tubing clusters 26 can comprise a coil of the tubing 14, and particularly, be in the form of a fin coil tubing arrangement as shown in FIG. 3. Each of the tubing clusters can then be thermally insulated from its neighboring tubing clusters and from its general surroundings by an insulation 40.

According to other examples (not illustrated), each of the tubing clusters can be connected to an inlet 32 and outlet 34, and contain an arrangement, which can be free of tubing, for exposing working fluid to impinging solar radiation.

It will be appreciated that several units, each of which is similar structurally to a tubing cluster, can be connected serially within the solar panel 12, as described below in more detail with reference to FIG. 5 Flow between the units can be unregulated, or regulated by check valves, control valves, or any other suitable mechanism. However, for the purpose of describing the present examples, the flow path between an inlet 32 and an outlet 34 will be considered as a single tubing cluster 26.

Reverting to FIG. 3, as alluded to above, the controller 18 is configured to control the states (i.e., open/closed) of the control valves 38, by sending appropriate signals to the valves, thereby regulating the state of flow of working fluid within each of the tubing clusters 26. It will be appreciated that, typically, the controller 18 is configured to operate the control valves 38 such that at least one of them is open at any time, so that flow of working fluid throughout the solar energy collection system 10 is not impeded at any time.

The controller 18 is configured to receive information regarding the condition of the working fluid within each of the tubing clusters 26, for example relating to one or more parameters of the working fluid such as the temperature and/or pressure thereof. For this purpose, appropriate sensors 44 can be provided to measure the working fluid parameters, and to provide information associated with these measurements to the controller 18. The controller 18 is configured to operate each of the control valves 38 at least partially based on this information.

The solar radiation system 10 can operate for providing heat to any external system as long as solar radiation is sufficient therefore. In case the solar radiation is too low, and none of the tubing clusters reach their designated threshold condition for opening the corresponding outlet control valve, the controller 18 cancan operate a bypass valve 46, feeding the working fluid into a heater 60. The heater 60 in this example is an electric heater assembly, but self evidently it can be a heater operated by any other source of energy. Upon flowing into heater 60, the working fluid is being heated, and its sensor 44 registers its appropriate parameter as mentioned above for sending information to the controller, which then regulates the energy input in heater 60 according to the designed needs of the system.

When the enclosure comprises three tubing clusters 26 with their respective inlet and outlet valves 36, 38, as shown in FIG. 3, it can be operated such that, at any time, one outlet valve 38 is open, and two others are closed. Thus, the controller 18, for example, can operate the three outlet valves 38 in a cyclic fashion, where always two tubing clusters 26 are heating/pressurizing working fluid, and one is discharging hot, pressurized fluid. However, the controller 18 can be configured to close all of the control valves 38 simultaneously, when this is required. When in operation the solar energy collection system 10 described above needs to raise the temperature and/or pressure of the working fluid to a certain state, each tubing cluster 26 will receive working fluid via its permanently open check valve 36, its sensor 44 will send to the controller 18 information about the working fluid parameter/s measured thereby, and based thereon the controller 18 will keep the control valve 38 of the tubing cluster 26 closed until the working fluid has not reached its desired state, i.e. the measured parameter has not reached its desired value, and when this happens the controller will open the control valve 38. The controller 18 can control the operation of all the tubing clusters 26 so that the solar energy collection system 10 will supply working fluid continuously or periodically as required.

Whilst in the examples described above, the inlet valves 36 of the tubing clusters 26 are in the form of unidirectional check valves only reacting to pressure difference on two sides thereof, they can be in the form of control valves similar to the control valves 48, which are opened and closed by the controller 18. Installing such a control inlet valve upstream each tubing cluster 26 (not shown) can enable its operation by the controller such that, when the inlet valve is opened, the outlet valve 38 is closed, and when the outlet valve 38 is opened, the inlet valve 48 is closed.

Figure 4:
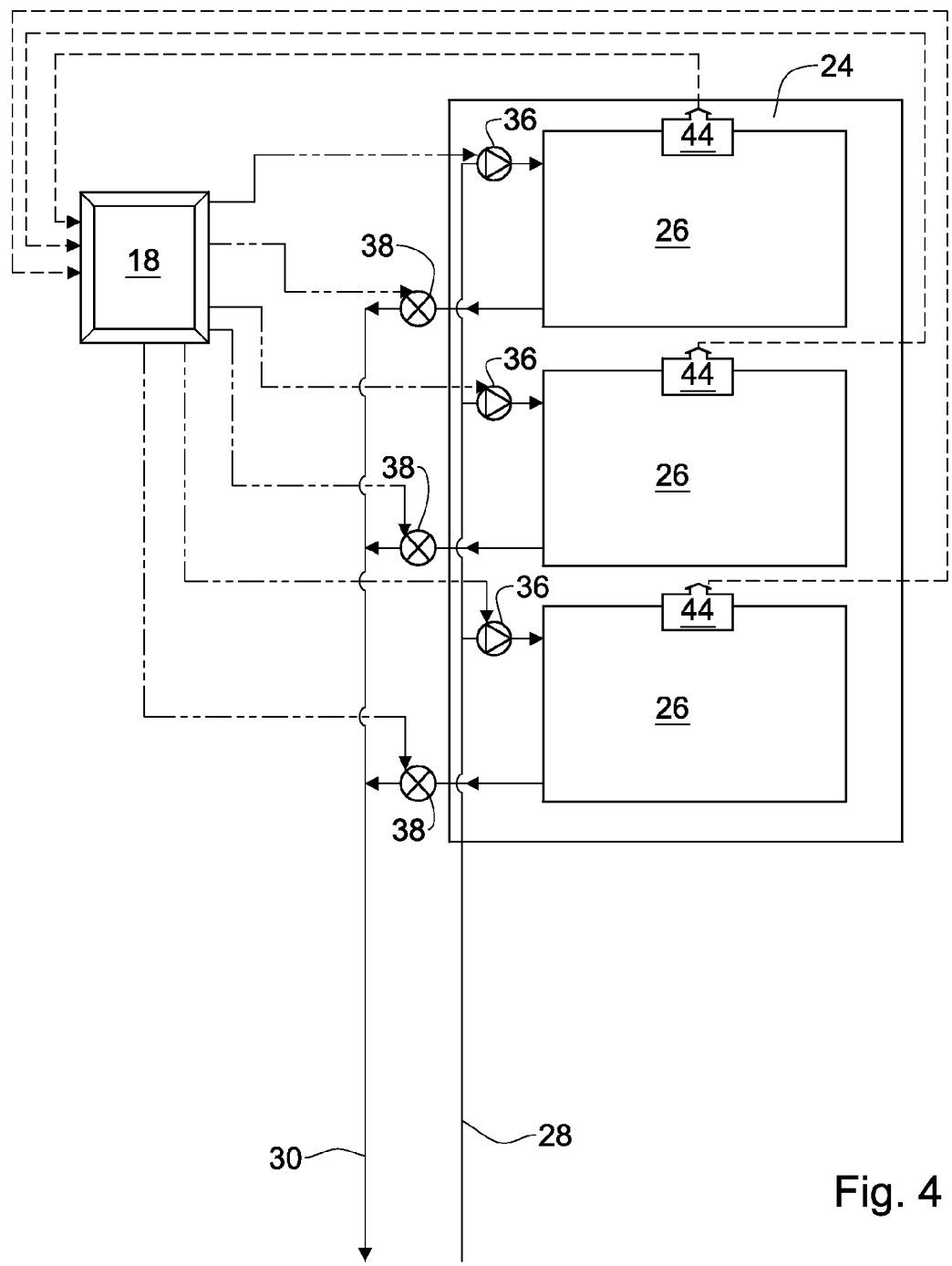
FIG. 4 is a schematic view of a specific example of the solar energy collection system, whose manifold is integrated into the enclosure.

Relating now specifically to FIG. 4, there is shown a solar panel 12 with an intake manifold integrated into the enclosure 20 such that the working fluid, upon entering intake manifold 30, simultaneously enters the solar panel 12. In this case, the inlet valves are configured as check valves 36.

It will be appreciated that the solar energy collection system 10 can comprise several solar panels 12. In such a case, each one can comprise a single tubing cluster 26, with a single intake manifold and a single outtake manifold serving several of such solar panels.

Figure 5:
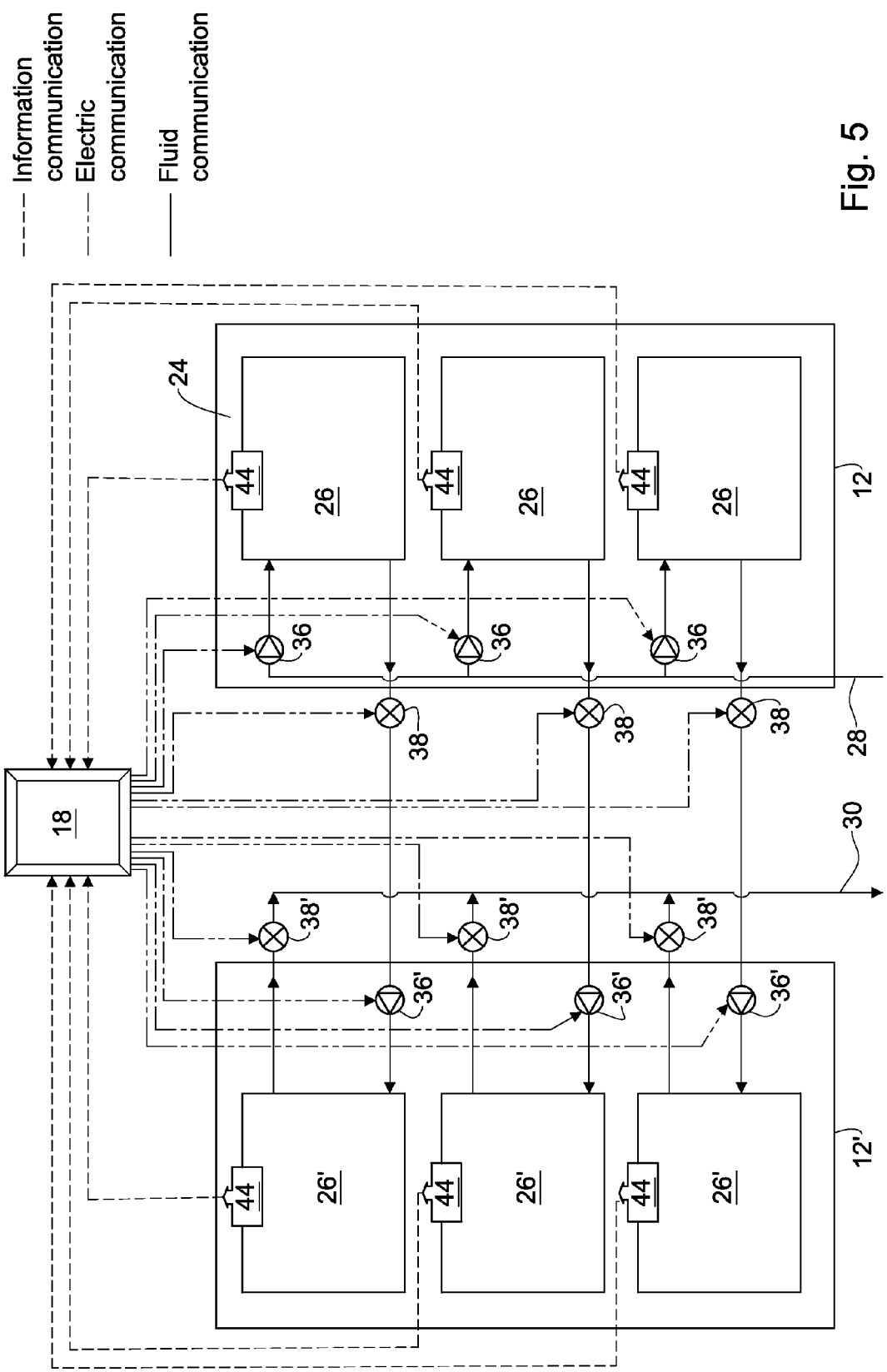
FIG. 5 is a schematic view of still another specific example of the solar energy collection system, where absorbers of two panels are connected in series.

In addition, the system can comprise at least two solar panels with tubing clusters 26 of one panel being connected in series with those 26' of the other panel, as illustrated in FIG. 5, by virtue of which working fluid can be heated to different degrees by the tubing clusters 26 and 26'. In this case, each tubing cluster 26 of panel 12 is connected to a corresponding tubing cluster 26' of neighboring panel 12' by way of providing fluid communication between outlet valve 38 of the former and inlet valve 36' of the latter. The working fluid flows thus into the system by way of intake manifold 28 and enters each tubing cluster 26 through its check valve 36. With the outlet valve 38 of the tubing cluster being closed, the working fluid entering it is locked therein and absorbs solar energy until its being heated to a first predefined degree as described above with respect to the systems shown in FIGS. 1 and 3. When this happens, the outlet valve 38 is opened and the working fluid will flow flow via the inlet check valve 36' into the tubing clusters 26' having its outlet valve 38' closed. There it is again locked in and is further heated to the desired final degree after which its outlet valve 38' is opened and now the heated and pressurized working fluid discharges via outlet manifold 30 towards an external system. Self evidently, the above described process can happen for each chain of serially interconnected tubing clusters 26, 26' independently, such that many different modes of operation can be achieved.

In another embodiment, it is possible to operate the panels in parallel using an intake manifold which is connected to each of the intake manifolds 28 associated with the several panels, and an outtake manifold connected to each of the outtake manifolds 30 associated with the several panels. All of the control valves 38 associated with one or more of the several solar panels 12 can be closed simultaneously, with other control valves remaining open in order to ensure flow of working fluid through the system.

It can be appreciated that valves and manifolds can be located such that they are in the shade of the tubing clusters/solar panels, thereby protecting them from excessive exposure to solar radiation, and enabling a more efficient footprint of the system when built of many panels combined into a larger area.

The invention claimed is:

1. A solar energy collection system having a system inlet and a system outlet, the solar energy collection system comprising:
   one or more hollow radiation absorbers, each having an inlet end configured for being in fluid communication with the system inlet, and an outlet end in fluid communication with the system outlet, each absorber configured for being filled by said fluid, to absorb solar radiation impinging thereon and transform its energy into heat and to thereby allow said fluid to be heated;
   an enclosure enclosing said one or more radiation absorbers, for blocking said heat from dissipating into surrounding environment;
   an inlet non-return valve upstream of said one or each absorber, for allowing a flow of said fluid thereto through said inlet end, while preventing backflow therefrom;
   an outlet valve downstream of said one or each absorber for allowing a flow of said fluid out thereof via said outlet end;
   a measuring device for determining at least one parameter of said fluid within said one or each radiation absorber, which depends on the amount of heat absorbed thereby; and
   a controller configured to control the operation of at least said outflow valve at least between an open state thereof in which said fluid can flow freely out of the associated radiation absorber, and a closed state thereof in which the fluid filling said associated radiation absorber is held therein for a period of time depending at least on a desired change of said parameter.

2. The solar energy collection system according to claim 1, further comprising an intake manifold in fluid communication with said inlet valves, for providing said inlet fluid communication for each of said absorbers via its corresponding inlet valve.

3. The solar energy collection system according to claim 1, further comprising an outtake manifold in fluid communication with said outlet valves, allowing outlet fluid communication with the outlet end of each of said absorbers via its corresponding outlet valve.

4. The solar energy collection system according to claim 3, wherein said controller is configured to selectively operate the outlet valves of a plurality of said absorbers.

5. The solar energy collection system according to claim 4, wherein the controller is configured to keep the outlet valve of at least one of the absorbers open whilst keeping the outlet valve of at least one other of the absorbers closed.

6. The solar energy collection system according to claim 4, wherein a group of at least three said absorbers is enclosed within one said enclosure, and said controller is configured to control the operation of their outlet valves in turn so that, when the outlet valve of each one of the three absorbers is open, the outlet valves of the other two absorbers are closed.

7. The solar energy collection system according to claim 1, wherein each of said absorbers within said enclosure is thermally insulated from all other absorbers in said enclosure.

8. The solar energy collection system according to claim 4, wherein said outtake manifold is disposed outside said enclosure and, said system is configured for such installation that said manifold is disposed in the shadow of said enclosure.

9. The solar energy collection system according to claim 1, wherein said outlet valve of at least some of the absorbers is disposed outside said enclosure, and said system is configured for such installation that the outlet valves of the absorbers are disposed in the shadow of said enclosure.

10. The solar energy collection system according claim 1, wherein said inlet valve is operable by energy other than electricity.

11. The solar energy collection system according to claim 1, wherein said inlet valve of each absorber is disposed within said enclosure.

12. The solar energy collection system according to claim 1, wherein said inlet valve is a check valve configured to be always open at least during the operation of the device.

13. The solar energy collection system according to claim 1, wherein said inlet valve is operable by electricity.

14. The solar energy collection system according to claim 1, wherein the inlet valves of at least some of the absorbers are disposed outside said enclosure and said system is configured for such installation that the inlet valves are disposed in the shadow of said enclosure.

15. The solar energy collection system according to claim 2, wherein said intake manifold is disposed outside said enclosure and, optionally, said system is configured for such installation that the intake manifold is disposed in the shadow of said enclosure.

16. The solar energy collection system according to claim 1, wherein said inlet valve is a control valve configured to be selectively operated by said controller between an open state at the time when said outlet valve is in the closed state, and a closed state at the time when said outlet valve is in the open state.

17. The solar energy collection system according to claim 1, wherein each said radiation absorber is interconnected serially via at least one of its valves with at least one other radiation absorber.

18. The solar energy collection system according to claim 1, wherein said measuring device is a temperature or a pressure sensor.

19. The solar energy collection system according to claim 1, configured for being installed with a closed-cycle heat exchange system.

20. The solar energy collection system according to claim 1, further comprising a bypass mechanism with a bypass valve in fluid communication with the system inlet and a bypass heater with a heater inlet in fluid communication with said bypass valve and a heater outlet in fluid communication with the system outlet.

21. The solar energy collection system according to claim 20, wherein said controller is configured to open said bypass valve when said parameter of the working fluid within none of the absorbers reaches said desired change.

22. The solar energy collection system according to claim 21, wherein said controller is configured to open energy supply to said bypass heater to heat said fluid until said parameter reaches said desired change.

23. A process of energy collection comprising:
providing a solar energy collection system according to claim 1;
determining at least one parameter of fluid in at least one radiation absorber of the system, which depends on the amount of heat absorbed thereby; and
controlling the operation of an outflow control valve of said absorber at least between its open state in which said fluid can flow freely out of the absorber, and its closed state in which the fluid filling said heat absorber is held therein for a period of time depending at least on a desired change of said parameter.

24. The process according to claim 23, wherein said parameter is temperature or pressure.

25. The process according to claim 23, wherein said controlling includes opening said outlet valve of at least one absorber upon said parameter of fluid within said one absorber reaching said desired change, while keeping at least the outlet valve of one other absorber closed.

26. The process according to claim 23, wherein said inlet valves are electrically controlled valves.

27. The process according to claim 26, wherein upon said parameter for one absorber with an open outlet valve being below a desired threshold parameter, said controlling includes:
closing said outlet valve of said one absorber,
opening its inlet valve, allowing said absorber to be filled by said fluid,
closing said inlet valve, and
keeping both the inlet and the outlet valves closed for a period of time depending at least on said desired change of said parameter.

28. The process according to claim 23, wherein said system includes at least three absorbers and said controlling includes the operation of their outlet valves in turn so that, when the outlet valve of each one of the three absorbers is open, the outlet valves of the other two absorbers are closed.

29. The process according to claim 28, wherein closing of the outlet valve of each of said three absorbers is performed at a time different from that when the outlet valve of any one of the other three absorbers is performed.

30. The process according claim 23, wherein the system comprises a first absorber with a first inlet valve and a first outlet valve and a second absorber with a second inlet valve and a second outlet valve, said first absorber being in serial fluid communication with said second absorber via said first outlet valve and said second inlet valve, and wherein said controlling includes:
opening said first outlet valve upon the parameter change of fluid within said first absorber reaching a first desired change, causing said fluid to flow into said second absorber via said second inlet valve;
closing said first outlet valve; and,
upon the parameter change of fluid within said second absorber reaching a second desired change, opening said second outlet valve.

31. The process according to claim 23, further including providing a bypass mechanism with a bypass valve in fluid communication with the system inlet and a bypass heater with a heater inlet in fluid communication with said bypass valve and a heater outlet in fluid communication with the system outlet, and wherein said controlling further includes opening said bypass valve when in none of said absorbers said desired change of said parameter is achieved.

32. The process according to claim 31, wherein said controlling further includes closing said bypass valve when in at least two said absorbers causing said desired change is achieved.

33. The process according to claim 31, wherein said controller is configured to cause said bypass heater to heat said fluid until in the fluid therein said parameter reaches said desired change.

* * * * *